United States Patent
Shimura et al.

(10) Patent No.: US 10,026,572 B2
(45) Date of Patent: Jul. 17, 2018

(54) ELECTRONIC EQUIPMENT, CONTROL PROGRAM, AND CONTROL METHOD

(71) Applicant: FUJITSU LIMITED, Kawasaki-shi, Kanagawa (JP)

(72) Inventors: Tatsuya Shimura, Kawasaki (JP); Masashi Hattori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 143 days.

(21) Appl. No.: 15/168,933

(22) Filed: May 31, 2016

(65) Prior Publication Data

US 2016/0351365 A1 Dec. 1, 2016

(30) Foreign Application Priority Data

Jun. 1, 2015 (JP) .................... 2015-111757

(51) Int. Cl.
| | |
|---|---|
| *H01H 35/00* | (2006.01) |
| *H01H 47/00* | (2006.01) |
| *H02H 3/08* | (2006.01) |
| *G06F 1/26* | (2006.01) |
| *H02H 9/00* | (2006.01) |
| *H02H 3/087* | (2006.01) |
| *H02H 3/24* | (2006.01) |
| *H02H 5/08* | (2006.01) |

(52) U.S. Cl.
CPC ............ *H01H 47/00* (2013.01); *G06F 1/26* (2013.01); *H02H 3/08* (2013.01); *H02H 9/00* (2013.01); *H02H 3/087* (2013.01); *H02H 3/243* (2013.01); *H02H 5/083* (2013.01)

(58) Field of Classification Search
CPC .......... H01H 47/00; H02H 3/08; H02H 3/087; H02H 5/083; H02H 9/00; G06F 1/26
See application file for complete search history.

(56) References Cited

U.S. PATENT DOCUMENTS

| | | | |
|---|---|---|---|
| 2004/0257037 A1* | 12/2004 | Hartung | H01M 2/1022 320/114 |
| 2010/0084918 A1* | 4/2010 | Fells | H02J 5/005 307/32 |
| 2010/0103566 A1* | 4/2010 | Chen | G06F 1/1626 361/1 |

FOREIGN PATENT DOCUMENTS

| | | |
|---|---|---|
| JP | 2004-227071 | 8/2004 |
| JP | 2004-342611 | 12/2004 |
| JP | 2007-257128 | 10/2007 |

* cited by examiner

*Primary Examiner* — Jared Fureman
*Assistant Examiner* — Duc M Pham
(74) *Attorney, Agent, or Firm* — Fujitsu Patent Center (57) ABSTRACT

Electronic equipment, includes: a power reception unit that receives electric power supplied from another electronic equipment to be connected; a proximity detection unit that detects proximity of the other electronic equipment; a detection unit that applies prescribed voltage to the power reception unit and detects an adhesion state of a conductive foreign substance in the power reception unit, when proximity of the other electronic equipment is detected; and a control unit that limits electric power supply through the power reception unit in accordance with the adhesion state of the conductive foreign substance in the power reception unit.

5 Claims, 4 Drawing Sheets

ELECTRONIC EQUIPMENT, CONTROL PROGRAM, AND CONTROL METHOD

CROSS-REFERENCE TO RELATED APPLICATION

This application is based upon and claims the benefit of prior Japanese Patent Application No. 2015-111757 filed on Jun. 1, 2015, the entire contents of which are incorporated herein by reference.

FIELD

An embodiment relates to electronic equipment, a control program, and a control method.

BACKGROUND

In recent years, portable information processing apparatuses (hereinafter also referred to as electronic equipment) which can be carried by users are becoming popular. For example, the portable information processing apparatuses include Personal Computers (PCs), cellular phones, smartphones, notebook PCs, tablet PCs, Personal Digital Assistants (PDAs), digital cameras, and game machines. The portable information processing apparatuses tend to be made smaller and thinner.

The smaller and thinner information processing apparatuses can charge a battery built in the information processing apparatuses and add an external interface by connecting auxiliary apparatuses, such as cradles and docking stations. Connection between the information processing apparatuses and the auxiliary apparatuses such as cradles is established by connecting, for example, a cradle connector provided in the information processing apparatuses to a main-body connector provided in the auxiliary apparatuses such as cradles. In the smaller and thinner information processing apparatuses, the same connector is used for battery charge and for access to external interface as it is desirable to reduce the number of components provided in their casings.

The auxiliary apparatuses such as cradles and docking stations provide such functions as power supply that charges the information processing apparatuses, through the respective connectors. The auxiliary apparatuses such as cradles also provide the information processing apparatuses with external interface functions, including interfaces to peripheral devices, such as external displays and keyboards, and to external networks, through the respective connectors.

A model of the aforementioned information processing apparatuses which further has a waterproof function is becoming popular. When the information processing apparatuses have the waterproof function, the apparatuses can be used under such a condition as rainy weather, within the range guaranteed by the waterproof function, for example. In the information processing apparatuses having the waterproof function, a waterproofed connector is used as a connector for the cradle connection, for example. Use of the waterproofed connector enables the information processing apparatuses to suppress infiltration of raindrops, water, or other fluids into the casings. The information processing apparatuses can suppress short-circuit failures of various devices inside the casings caused by infiltrated water or other fluids.

[Patent document 1] Japanese Laid-open Patent Publication No. 2004-342611

[Patent document 2] Japanese Laid-open Patent Publication No. 2004-227071

[Patent document 3] Japanese Laid-open Patent Publication No. 2007-257128

SUMMARY

According to an aspect of the embodiment, electronic equipment, includes: a power reception unit that receives electric power supplied from another electronic equipment to be connected; a proximity detection unit that detects proximity of the other electronic equipment; a detection unit that applies prescribed voltage to the power reception unit and detects an adhesion state of a conductive foreign substance in the power reception unit, when proximity of the other electronic equipment is detected; and a control unit that limits electric power supply through the power reception unit in accordance with the adhesion state of the conductive foreign substance in the power reception unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 2B illustrates an example of hardware constitution of a cradle or the like;

DESCRIPTION OF EMBODIMENT

The auxiliary apparatuses such as cradles and docking stations, which are connected to the information processing apparatuses having the waterproof function, are not assumed to be used while wet with water or other fluids. Accordingly, when the information processing apparatuses in such a state as a wet state are connected to cradles or the like, there is a possibility that circuits energized through the cradles or the like are short-circuited due to water or other fluids adhering to components such as connection connectors. The short-circuit, if caused by electrical connection with the cradles or the like, may possibly cause failures of devices inside the information processing apparatuses.

Hereinafter, electronic equipment according to one embodiment will be described with reference to the drawings. The structure of the following embodiment is illustrative, and is not restrictive of the structure of the embodiment of the electronic equipment. Hereinafter, the electronic equipment will be described with reference to the drawings of FIGS. 1 to 4.

Embodiment

Figure 1:
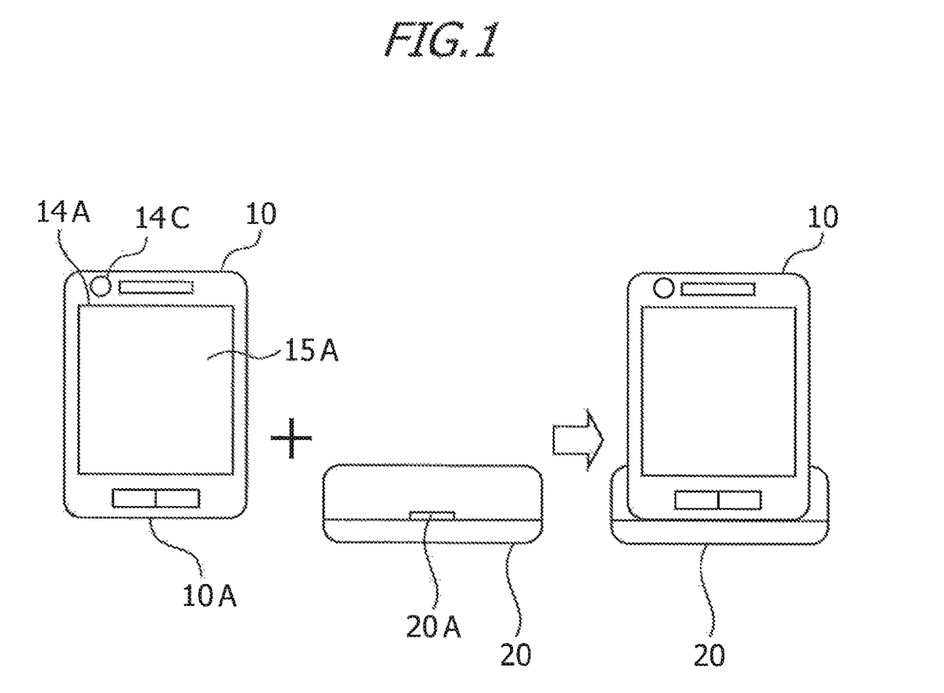
FIG. 1 is an explanatory view of an information processing apparatus (electronic equipment) of an embodiment.

In FIG. 1, an explanatory view of an information processing apparatus (hereinafter also referred to as electronic equipment) of the present embodiment is illustrated. For example, the information processing apparatus 10 of the present embodiment is a portable information processing apparatus. Examples of the information processing apparatus 10 includes Personal Computers (PCs), cellular phones, smartphones, notebook PCs, tablet PCs, Personal Digital Assistants (PDAs), digital cameras, and game machines.

The information processing apparatus 10 of the present embodiment includes, for example, a cradle connection connector 10A that connects to an auxiliary apparatus such as a cradle 20 or a docking station. Here, the auxiliary apparatus such as the cradle 20 or the docking station is extension equipment of a desktop type (stand type) or a keyboard type, for example.

The cradle 20 or the like includes a main-body connection connector 20A which can connect to the cradle connection connector 10A of the information processing apparatus 10. The cradle 20 or the like provide the information processing apparatus 10, which is connected through the main-body connection connector 20A, with a function of charging a battery which is built in the information processing apparatus 10 and an external power function. The cradle 20 or the like also provides the connected information processing apparatus 10 with an external interface function.

The external interface function includes, for example, interfaces to peripheral equipment, such as an external display, a keyboard, and a Universal Serial Bus (USB) memory connected through the cradle 20. The external interface function also includes, for example, interfaces to a modem and the like that are connected through the cradle 20. By utilizing the modem and the like connected through the cradle 20, the information processing apparatus 10 can connect to public networks such as the Internet, wireless networks such as wireless Local Area Networks (LANs), and wired networks such as wire LANs, for example. The information processing apparatus 10 connected with the cradle 20 or the like can also utilize, for example, application programs (hereinafter also referred to as applications) installed in the information processing apparatus 10 as in the case of stationary PCs called desktop PCs.

The cradle connection connector 10A and the main-body connection connector 20A are provided with a plurality of contact pins that provide the aforementioned functions. The plurality of contact pins include a power pin that supplies electric power to the information processing apparatus 10 through the cradle 20, and a GND pin. The plurality of contact pin includes a plurality of signal connection pins that provide the information processing apparatus 10 with an external interface function included in the cradle 20. Since the cradle connection connector 10A includes the power pin, the GND pin, and the plurality of signal connection pins, the information processing apparatus 10 can reduce the number of components provided in a casing, for example.

The information processing apparatus 10 illustrated in FIG. 1 is one example in which the cradle connection connector 10A is placed at the bottom of the casing. The cradle connection connector 10A provided at the bottom of the casing has an opening portion recessed toward the casing from a surface position on a bottom surface of the casing of the information processing apparatus 10. The power pin, the GND pin, and the plurality of signal connection pins described before are arranged on an inner wall surface of the opening portion of the cradle connection connector 10A. The power pin and the GND pin of the cradle connection connector 10A are arranged with a distance therebetween. The plurality of signal connection pins are arranged between the power pin and the GND pin. Here, the cradle connection connector 10A may be arranged in planar form on the bottom surface of the casing of the information processing apparatus 10. In this arrangement, infiltration of water into the casing of the information processing apparatus 10 can be prevented.

The cradle 20 illustrated in FIG. 1 is one example of a cradle formed to have a base in an L-shaped cross section so as to support the information processing apparatus 10 to be connected. The main-body connection connector 20A is provided on a mounting surface of the cradle 20 on which the information processing apparatus 10 is mounted. The main-body connection connector 20A of the cradle 20 has, for example, a power pin, a GND pin, and a plurality of signal connection pins projecting from surface positions on the mounting surface.

The information processing apparatus 10 is mounted on the cradle 20, while the power pin, the GND pin, and the plurality of signal connection pins projecting from the mounting surface of the cradle 20 being housed in the recess-shaped opening portion of the cradle connection connector 10A, for example. The power pin, the GND pin, and the plurality of signal connection pins arranged on the inner wall surface of the recess-shaped opening portion of the cradle connection connector 10A come into contact with the power pin, the GND pin, and the plurality of signal connection pins of the main-body connection connector 20A corresponding to the respective contact pins at specified pressure. When the various contact pins of the cradle connection connector 10A are in contact with their corresponding various contact pins on the main-body connection connector 20A side at the specified pressure, the information processing apparatus 10 mounted on the cradle 20 is provided with the external interface function described before.

When the information processing apparatus 10 has a waterproof function, a waterproofed connector is used as the cradle connection connector 10A, for example. By use of the waterproofed connector, the information processing apparatus 10 can suppress infiltration of raindrops, water, or other fluids into the casing through the cradle connection connector 10A, for example. The information processing apparatus 10 can suppress failures of devices due to short-circuit (short-circuit state) caused by, for example, water or other fluids infiltrated into the casing.

However, the cradle 20 or the like connected to the information processing apparatus 10 having the waterproof function is not assumed to be used while, for example, the information processing apparatus 10 is wet with water or other fluids.

Accordingly, in the case where, for example, the information processing apparatus 10 as a comparative example is connected to the cradle 20 or the like while wet with water and other fluids, there is a possibility that short-circuit (short-circuit state) is caused by water or other fluids adhering to the cradle connection connector 10A. In the state where water or other fluids adhere to the cradle connection connector 10A, short-circuit may possibly occur between the respective contact pins (including the power pin and the GND pin) on the cradle connection connector 10A side and the respective contact pins (including the power pin and the GND pin) on the main-body connection connector 20A side of the cradle 20 or the like, the connectors being in a contact state. The short-circuit is assumed to occur between the GND pin and the respective signal connection pins of the cradle connection connector 10A which are in a conductive state with electric power through water or other fluids, the electric power being conducted through the power pin on the side of the main-body connection connector 20A of the cradle 20 or the like. Or the short-circuit is assumed to occur between the GND pin and the respective signal connection pins of the main-body connection connector 20A which are in a conductive state with electric power through water or other fluids, the electric power being conducted through the power pin on the side of the cradle connection connector 10A of the information processing apparatus 10.

When the aforementioned short-circuit occurs, there is a possibility, for example, that the various devices in the information processing apparatus 10 as a comparative example may break down due to overcurrent or the like which is passed through the power pin of the main-body connection connector 20A of the cradle 20 or the like.

The information processing apparatus 10 of the present embodiment has a function of detecting whether or not the cradle connection connector 10A is in the state of causing short-circuit due to wetting and the like, before being connected with the cradle 20 or the like. The information processing apparatus 10 of the present embodiment has a function of controlling permission/inhibition of connection for receiving application voltage to the power pin and the signal connection pin of the cradle connection connector 10A in accordance with the state of the detected cradle connection connector 10A.

The information processing apparatus 10 of the present embodiment disconnects the connection path for receiving the application voltage to the power pin and the signal connection pin when, for example, the cradle connection connector 10A is in the state of causing short-circuit. On the contrary, when, for example, the cradle connection connector 10A is not in the state of causing short-circuit, the information processing apparatus 10 of the present embodiment makes a connection for receiving the application voltage to the power pin and the signal connection pin.

As a result, the information processing apparatus 10 of the present embodiment can control voltage application to the power pin in accordance with the state of the cradle connection connector 10A before connection with the cradle 20 or the like. Similarly, the information processing apparatus 10 of the present embodiment can control signal connection to the signal connection pins in accordance with the state of the cradle connection connector 10A before connection with the cradle 20 or the like. The information processing apparatus 10 can suppress short-circuit failures caused by energization at the time of connection with the cradle 20 or the like, even when the cradle connection connector 10A is in the state of possibly causing short-circuit, for example, in the state of water or other fluids adhering to the power pin and the signal connection pins.

Here, the power pin may receive electric power and also transmit electric power. That is, the information processing apparatus 10 may receive electric power from the cradle 20, and the information processing apparatus 10 may also transmit electric power to the cradle 20.

Specifically, the information processing apparatus 10 determines whether or not to receive or transmit electric power. When detecting the state of causing short-circuit before making the determination, the information processing apparatus 10 disconnect the connection path for transmitting the application voltage to the power pin or receiving the application voltage. Or the cradle 20 determines whether or not to receive or transmit electric power. When detecting the state of causing short-circuit before making the determination, the cradle 20 disconnects the connection path for transmitting the application voltage to the power pin, or receiving the application voltage.

When the apparatus having a function of detecting whether or not to receive or transmit electric power is provided with the function of detecting whether or not being in the state of causing short-circuit due to wetting or other causes, it becomes possible to suppress short-circuit failures caused by energization at the time of connection between the information processing apparatus 10 and the cradle 20.

[Equipment Constitution]
(Information Processing Apparatus)

Figure 2A:
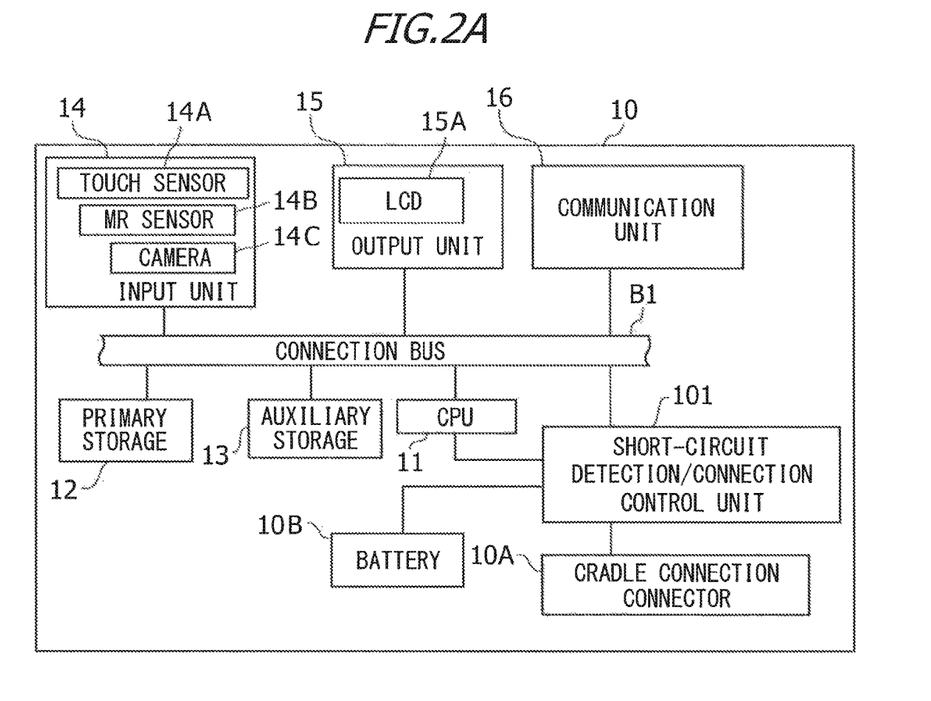
FIG. 2A illustrates an example of hardware constitution of the information processing apparatus (electronic equipment) of the embodiment.

FIG. 2A illustrates one example of the hardware constitution of the information processing apparatus 10 of the present embodiment. The information processing apparatus 10 illustrated in FIG. 2A has a CPU (Central Processing Unit) 11, a primary storage 12, an auxiliary storage 13, an input unit 14, an output unit 15, and a communication unit 16 which are connected to each other via a connection bus B1. The primary storage 12 and the auxiliary storage 13 are storage media readable by the information processing apparatus 10.

The information processing apparatus 10 of the present embodiment illustrated in FIG. 2A has a cradle connection connector 10A, a battery 10B, and a short-circuit detection/connection control unit 101. The cradle connection connector 10A and the battery 10B are connected to the short-circuit detection/connection control unit 101. The short-circuit detection/connection control unit 101 is connected to the connection bus B1. The short-circuit detection/connection control unit 101 is connected to the CPU 11 independently of the connection bus B1. The cradle connection connector 10A is one example of the "power reception unit."

The information processing apparatus 10 of the present embodiment illustrated in FIG. 2A has a sensor, such as a magnetoresistive (MR) sensor 14B, in the input unit 14, the sensor detecting proximity of the cradle 20 or the like. For example, the MR sensor 14B detects magnetic field strength (intensity) around the information processing apparatus 10 caused by a magnetic resistance element such as a magnet provided in the cradle 20 or the like. The MR sensor 14B outputs an electrical signal having a level corresponding to the detected magnetic field intensity. The MR sensor 14B outputs the electrical signal corresponding to the detected magnetic field strength to the CPU 11 through the connection bus B1. Here, the MR sensor 14B is one example of the "proximity detection unit."

The sensor that detects proximity of the cradle 20 or the like is not limited to the MR sensor. The sensor included in the information processing apparatus 10 may be any sensor capable of detecting proximity of the cradle 20 or the like. Examples of such a sensor include proximity sensors which detect existence of an object proximate to the sensors based on changes in infrared light, electromagnetic waves, supersonic waves, electrostatic capacity, and the like. The information processing apparatus 10 may also detect proximity of the cradle 20 or the like by reading information such as ID information on an IC tag or the like installed on the cradle 20 or the like, through near field communication such as Near Field Communication (NFC).

In the information processing apparatus 10 illustrated in FIG. 2A, the CPU 11 expands programs stored in the auxiliary storage 13 in a work area of the primary storage 12 so as to be executed, and controls the peripheral equipment through execution of the programs. As a result, the information processing apparatus 10 can achieve functions coincident with the aforementioned specified objects. The CPU 11 may be a microcomputer, a chip set, or the like which can control an output signal on the basis of an input signal.

In the information processing apparatus 10 illustrated in FIG. 2A, the cradle connection connector 10A is a connector connected to the main-body connection connector 20A provided in the cradle 20 or the like as described in FIG. 1.

The information processing apparatus 10 can expand the functions of the information processing apparatus 10 by utilizing the function of charging the battery 10B, the external power function, and the external interface function provided by the cradle 20 or the like through the cradle connection connector 10A.

The cradle connection connector 10A is a waterproofed connector if the information processing apparatus 10 includes a waterproof function. The cradle connection connector 10A includes a power pin and a GND pin so as to use the charging function and the external power function provided by the cradle 20 or the like. The cradle connection connector 10A also includes a plurality of signal connection pins so as to use the external interface function provided by the cradle or the like. The plurality of signal connection pins are connected to a signal bus relating to the external interface function in the connection bus B1, through the short-circuit detection/connection control unit 101.

The battery 10B is a chargeable power supply built in the information processing apparatus 10. The battery 10B is connected to the power pin of the cradle connection connector 10A through the short-circuit detection/connection control unit 101.

The short-circuit detection/connection control unit 101 detects short-circuit of the cradle connection connector 10A. The short-circuit of the cradle connection connector 10A is caused by, for example, adhesion of conductive fluids, such as water, raindrops, and solvent, and by adhesion of conductive substances such as powdery metals. In the following descriptions, substances such as conductive fluids and powdery metals are also collectively called "a conductive foreign substance."

The short-circuit detection/connection control unit 101 is equipped with, for example, a check power supply having current limitation to check the short-circuit of the cradle connection connector 10A, and applies the check power supply voltage to the power pin of the cradle connection connector 10A.

When the aforementioned conductive fluids and conductive substances adhere to the cradle connection connector 10A, a short-circuit current passes from a check power supply to between, for example, the power pin and the GND pin. The short-circuit detection/connection control unit 101 detects the short-circuit current, which flows in from the check power supply through the power pin, with use of a detection device. Examples of the detection device which detects the short-circuit current include an overcurrent protection Integrated Circuit (IC) and a voltage drop detection IC. The short-circuit detection/connection control unit 101 notifies detection of the short-circuit of the cradle connection connector 10A to the CPU 11 through a connection independent of the connection bus B1.

The short-circuit detection/connection control unit 101 also controls the connection state between the power pin of the cradle connection connector 10A and the battery 10B. Similarly, the short-circuit detection/connection control unit 101 controls the connection state between each signal connection pin of the cradle connection connector 10A and a signal bus relating to the external interface function in the connection bus B1. The short-circuit detection/connection control unit 101 controls the connection states in response to, for example, an instruction from the CPU 11.

The CPU 11 determines whether or not the cradle connection connector 10A is in a short-circuit state based on, for example, notification of short-circuit detection from the overcurrent protection IC or the like in the short-circuit detection/connection control unit 101. The CPU 11 notifies the short-circuit detection/connection control unit 101 of an instruction regarding connection permission/inhibition for receiving the application voltage to the power pin and the signal connection pins of the cradle connection connector 10A based on, for example, the result of determining the short-circuit state.

The short-circuit detection/connection control unit 101 connects paths for receiving the application voltage to the power pin and the signal connection pins based on, for example, the notification regarding the connection permission from the CPU 11. The short-circuit detection/connection control unit 101 also disconnects connection paths for receiving the application voltage to the power pin and the signal connection pins based on, for example, the notification regarding the connection inhibition from the CPU 11.

The short-circuit detection/connection control unit 101 may execute the aforementioned processing without using the CPU 11. For example, the short-circuit detection/connection control unit 101 may disconnect the paths for receiving the application voltage to the power pin and the signal connection pin, when short-circuit is detected by the overcurrent protection IC or the like. Similarly, the short-circuit detection/connection control unit 101 may connect the connection paths for receiving the application voltage to the power pin and the signal connection pins, when short-circuit is not detected with the overcurrent protection IC or the like.

The CPU 11 is a central processing unit which controls the entire information processing apparatus 10. The CPU 11 performs processing in accordance with the programs stored in the auxiliary storage 13. The primary storage 12 is a storage medium in which the CPU 11 caches programs and data and expands work areas. The primary storage 12 includes Random Access Memories (RAMs) and Read Only Memories (ROMs), for example.

The auxiliary storage 13 stores various kinds of programs and various kinds of data in a storage media in readable and writable way. The auxiliary storage 13 is also called an external storage. The auxiliary storage 13 stores an operating system (OS), various programs, various tables, and the like. For example, the OS provides the installed application programs (hereinafter also called applications) with interfaces to the resources that the application programs manage.

The applications installed on the information processing apparatus 10 implement application functions with use of the interfaces to the resources provided through the OS. The OS includes a communication interface program which exchanges data with external apparatuses and the like connected through the communication unit 16 and with external interfaces and the like provided by the cradle 20 or the like. The external apparatuses include, for example, other information processing apparatuses and external storages such as PCs and servers on a network which is not illustrated.

Examples of the auxiliary storage 13 include Erasable Programmable ROMs (EPROMs), solid state drive devices, and hard disk drive (HDD) devices. Examples of the auxiliary storage 13 include CD drive devices, DVD drive devices, and BD drive devices. Examples of the storage media include silicon discs including non-volatile semiconductor memories (flash memories), hard disks, CDs, DVDs, BDs, USB memories, and memory cards.

The input unit 14 receives an operation instruction and the like from a user or other persons. The input unit 14 is an input device, such as a camera 14C, an input button, a touch sensor 14A, a pointing device, and a microphone. The input unit 14 may include a keyboard and a wireless remote control. For example, the pointing device includes: a touch panel having a combination of a touch sensor 14A and a display device such as an LCD 15A of the output unit 15; a mouse; a trackball; or a joy stick. The input unit 14 also includes various sensors, such as an MR sensor 14B.

The output unit 15 outputs the data processed by the CPU 11, and the data stored in the primary storage 12. The output unit 15 includes a display device such as a Cathode Ray Tube (CRT) display, a Liquid Crystal Display (LCD) 15A, a Plasma Display Panel (PDP), an Electroluminescence (EL) panel, or an organic EL panel. The output unit 15 also includes an output device such as a printer and a speaker. For example, the communication unit 16 is an interface with the network to which the information processing apparatus 10 is connected. Examples of the network include public networks, such as the Internet, wireless networks such as mobile phone networks including communication base stations, and LANs.

(Cradle)

Figure 2B:
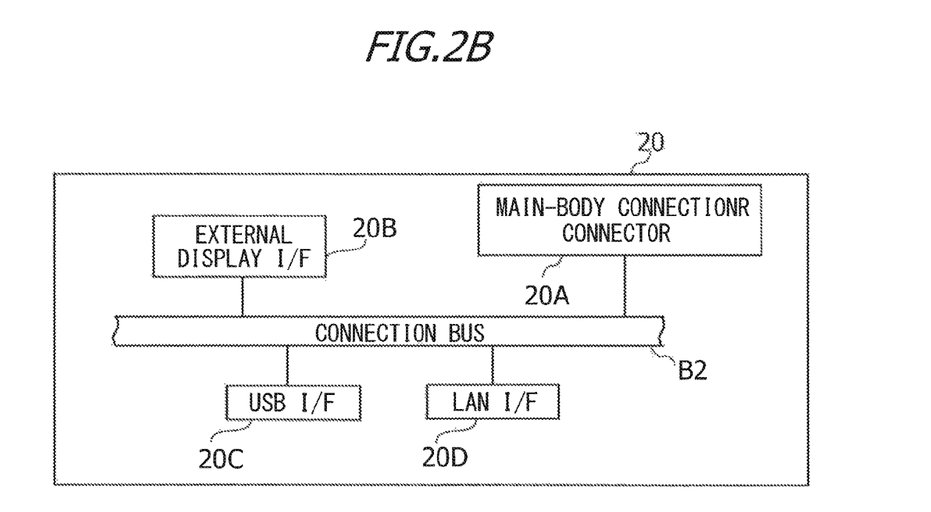

FIG. 2B illustrates one example of the hardware constitution of the cradle 20. The cradle 20 illustrated in FIG. 2B has a main-body connection connector 20A, an external display I/F 20B, a USB I/F 20C, and a LAN I/F 20D, which are connected to each other through a connection bus B2. The cradle 20 or the like provide the information processing apparatus 10, which is connected through the main-body connection connector 20A, with a function of charging a battery 10B which is built in the information processing apparatus 10 and an external power function. The cradle 20 or the like provides the connected information processing apparatus 10 with an external interface function.

In the cradle 20 illustrated in FIG. 2B, the main-body connection connector 20A is a connector connected to the cradle connection connector 10A of the information processing apparatus 10 as described in FIG. 1. The main-body connection connector 20A includes a power pin, a GND pin, and a plurality of signal connection pins. The connection bus B2 of the cradle 20 is connected to a power supply which is not illustrated.

The external display I/F 20B is a connection interface to an external display such as an LCD connected to the cradle 20 or the like. The USB I/F 20C is a connection interface to USB-connectable peripheral equipment such as a keyboard connected to the cradle 20 or the like and to an external storage such as a USB memory. The LAN I/F 20D is a connection interface to a LAN to which the cradle 20 or the like is connected. For example, the LAN I/F 20D is a connection interface to public networks such as the Internet, wireless networks such as wireless LANs, and wired networks such as wire LANs.

[Constitution of Short-Circuit Detection/Connection Control Unit]

(Circuit Constitution)

Figure 3:
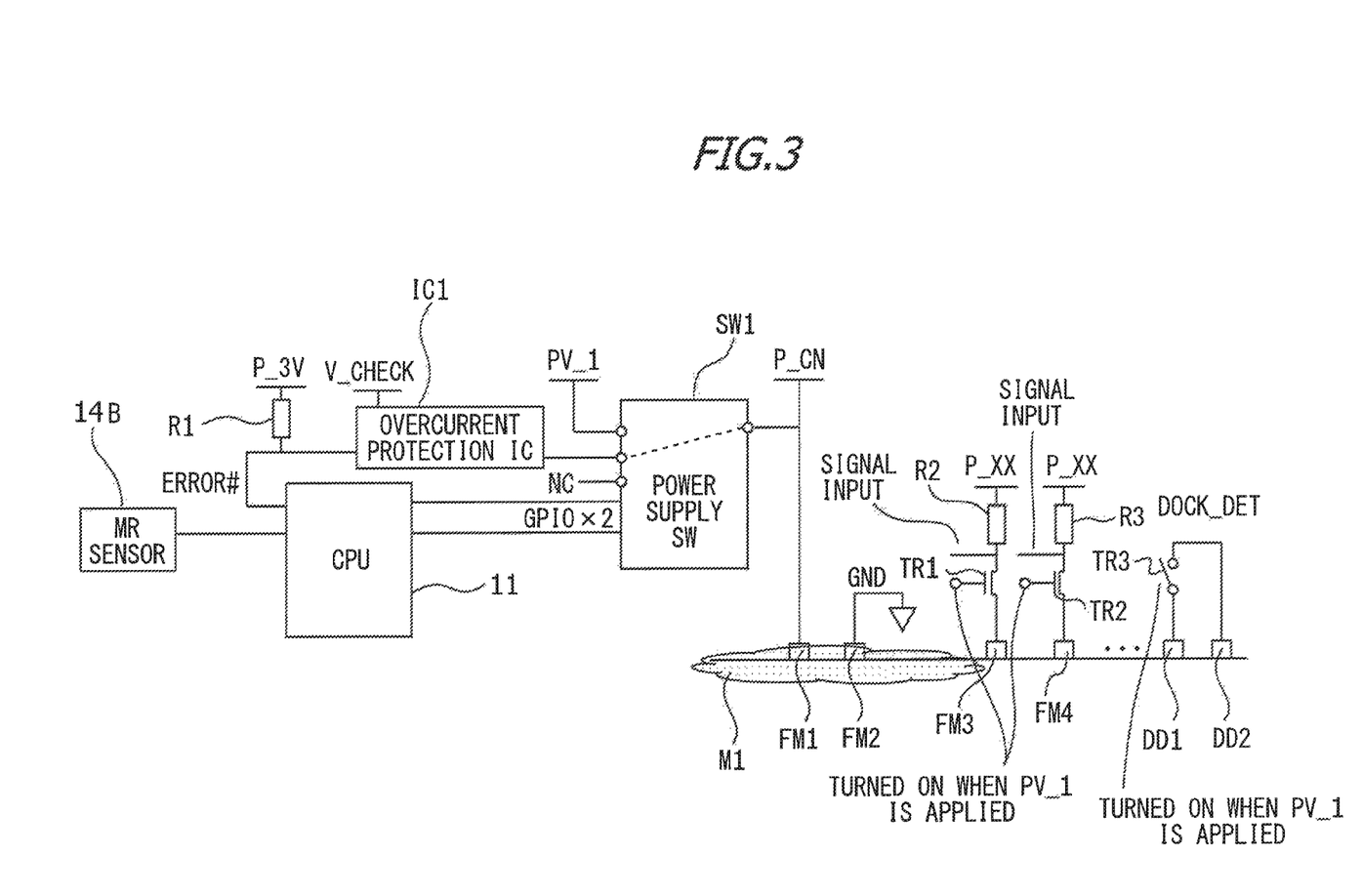
FIG. 3 illustrates an example of a circuit constitution in a short-circuit detection/connection control unit.

A description is now given of the constitution of the short-circuit detection/connection control unit 101 included in the information processing apparatus 10 of the present embodiment with reference to FIG. 3. FIG. 3 illustrates one example of the circuit constitution in the short-circuit detection/connection control unit 101.

In the circuitry illustrated in FIG. 3, reference signs P_3V and P_XX denote connection terminals for pull-up, and a reference sign P_CN denotes a connection terminal for short-circuit detection. Furthermore, a reference sign P_CN denotes a connection terminal that exchanges electric power. A reference sign V_CHECK denotes a connection terminal connected to the check power supply to detect whether or not the cradle connection connector 10A is in the state of causing short-circuit. A reference sign PV_1 denotes a connection terminal connected to the battery 10B, the AC adapter, and the like included in the information processing apparatus 10. Devices R1-R3 are resistors for adjusting pull-up voltage and the like.

In the circuit constitution illustrated in FIG. 3, reference signs FM1 to FM4, DD1, and DD2 denote various contact pins included in the cradle connection connector 10A. For example, FM1 denotes a power pin and FM2 denotes a GND pin. For example, FM3 and FM4 denote signal connection pins, respectively. Although two signal connection pins FM3 and FM4 are illustrated in the example of FIG. 3, the number of the signal connection pins corresponds to the number n of the signal connection pins included in the cradle connection connector 10A. For example, DD1 and DD2 denote contact pins connected to a monitoring circuit DOCK_DET.

The monitoring circuit DOCK_DET is a loop circuit which notifies the state of connection between the information processing apparatus 10 and the cradle 20 or the like to the side of the cradle 20 or the like. While the information processing apparatus 10 is in connection with the cradle 20 or the like, the contact pins DD1 and DD2 in the monitoring circuit DOCK_DET are in connection. With the monitoring circuit DOCK_DET of the short-circuit detection/connection control unit 101, the side of the cradle 20 or the like is notified of a status value indicative of the connection state, such as "connected with main body" and "not connected with main body."

The short-circuit detection/connection control unit 101 illustrated in FIG. 3 has a power supply switching device SW1 and an overcurrent protection device IC1, which are connected to the CPU 11. For example, the power supply switching device SW1 is a selector switch having a plurality of input terminals and a single output terminal. For example, the power supply switching device SW1 selects one input out of a plurality of inputs connected to the input terminals, and connects it to the output terminal. Switching the inputs of the power supply switching device SW1 is controlled by the CPU 11 which is connected to the power supply switching device SW1.

The overcurrent protection device IC1 is an integrated circuit which detects an overcurrent state between an input terminal and an output terminal. The overcurrent protection device IC1 disconnects a connection between the input terminal and the output terminal, when the overcurrent state is detected between the input terminal and the output terminal. The overcurrent protection device IC1 also notifies the CPU 11 to be connected of the detected overcurrent state as "ERROR#" signal.

Here, the overcurrent protection device IC1 may be a voltage drop detection IC which detects voltage drop of the power supply voltage supplied from the check power supply. For example, the voltage drop detection IC detects a voltage drop between the input terminal and the output terminal which is caused by short-circuit current. The voltage drop detection IC may notify the CPU 11 to be connected of the detected voltage drop as "ERROR#" signal.

Examples of a connection interface for connecting each of the power supply switching device SW1 and the overcurrent protection device IC1 to the CPU 11 include a general purpose input/output (GPIO) included in the CPU 11. By connecting the GPIO interface with each of the devices, the CPU 11 can execute interrupt processing by using, for example, notification of "ERROR#" signal of the overcurrent protection device IC1 as a trigger. For example, the CPU 11 can reflect the result of executing the interrupt processing upon switching control of the power supply switching device SW1 which is connected to the GPIO.

The short-circuit detection/connection control unit 101 also has control device TR1 and TR2. The control device TR1 and TR2 are devices which control the connection state of the connection paths to each of the signal connection pins and the like which are provided in the cradle connection connector 10A. The control device which controls the connection state of a connection path is provided for each signal connection pin, for example. Similarly, the short-circuit detection/connection control unit 101 has a control device TR3. The control device TR3 is a device which controls the connection state of a connection path to the contact pins of the monitoring circuit DOCK_DET provided in the cradle connection connector 10A.

Although the control devices TR1 and TR2 are illustrated in the example of FIG. 3, the total number of the control devices is provided corresponding to the total number n of the signal connection pins included in the cradle connection connector 10A.

For example, the control devices TR1 to TR3 are switching devices, such as transistors and Field Effect Transistors (FETs). The control devices TR1 and TR2 switch the connection statuses of the connection paths connected to, for example, the signal connection pins FM3 and FM4 of the cradle connection connector 10A, the connection statuses including a connected (ON) state and a disconnected (OFF) state. The control device TR3 switches the connection statuses of the connection paths to, for example, the contact pins DD1 and DD2, which function as a loop circuit of the cradle connection connector 10A, the connection statuses including a connected (ON) state and a disconnected (OFF) state. Switching the connection statuses of the control devices TR1 to TR3 is controlled by the CPU 11.

As illustrated in FIG. 3, the power supply of the battery 10B connected to the connection terminal PV_1 is connected to one of the input terminals of the power supply switching device SW1. The check power supply connected to the connection terminal V_CHECK is connected to another of the input terminals of the power supply switching device SW1 through the overcurrent protection device IC1. The check power supply applied to the connection terminal V_CHECK may be generated by, for example, dividing the power supply voltage of the battery 10B.

The power supply switching device SW1 has an open-state input terminal (NC) having no connection destination. The output terminal of the power supply switching device SW1 is connected to the power pin FM1 of the cradle connection connector 10A. In an initial state of the power supply switching device SW1, the output terminal is connected to the open-state input terminal (NC).

A signal relating to the external interface function, among the signals in the connection bus B1, is connected to the signal connection pins FM3 and FM4 of the cradle connection connector 10A, through the control devices TR1 and TR2. The contact pins DD1 and DD2 connected to the monitoring circuit DOCK_DET of the cradle connection connector 10A are connected through the control device TR3. The control devices TR1 to TR3 in the initial state are in a disconnected (OFF) state.

(Circuit Operation)

The CPU 11 illustrated in FIG. 3 is connected to the MR sensor 14B of the input unit 14 through the connection bus B1 as described in FIG. 2A. For example, the CPU 11 receives a detection signal (electrical signal) output from the MR sensor 14B. The MR sensor 14B outputs the detection signal (electrical signal) having a level corresponding to the distance between the information processing apparatus 10 and the cradle 20 or the like. The level of the detection signal changes in accordance with, for example, the magnetic field strength of a magnet or the like mounted on the cradle 20 or the like.

For example, the CPU 11 detects proximity of the cradle 20 or the like based on the level of the received detection signal and makes the short-circuit detection/connection control unit 101 function. For example, the CPU 11 notifies the power supply switching device SW1 connected through the GPIO of a control instruction for controlling connection between the input terminals and the output terminal.

Upon reception of the control instruction from the CPU 11 connected through the GPIO, the power supply switching device SW1 of the short-circuit detection/connection control unit 101 connects the check power supply connected to one of the input terminals through the overcurrent protection device IC1 to the output terminal. The voltage of the current-limited check power supply is applied to the power pin FM1 of the cradle connection connector 10A through the overcurrent protection device IC1.

The cradle connection connector 10A is in the state of causing short-circuit when, for example, conductive foreign substances, such as water, solvents, and metallic granular materials adhere thereto. In the example of FIG. 3, a conductive foreign substance M1 is in the state of adhering to between the power pin FM1 and the GND pin FM2 of the cradle connection connector 10A. A short-circuit current passes between the power pin FM1 and the GND pin FM2 of the cradle connection connector 10A through the conductive adhering foreign substance M1.

The short-circuit current generated between the power pin FM1 and the GND pin FM2 of the cradle connection connector 10A is detected by the overcurrent protection device IC1. The overcurrent protection device IC1 which detected the short-circuit current disconnects a connection of the check power supply to the power supply switching device SW1, and also notifies the CPU 11 of the detected overcurrent state as "ERROR#" signal.

The CPU 11 receives the pulled-up "ERROR#" signal through the GPIO. The CPU 11 executes interrupt processing with reception of the "ERROR#" signal as a trigger. As a result of interrupt processing, the CPU 11 notifies the power supply switching device SW1 of a control instruction to connect the open-state input terminal (NC) having no connection destination to the output terminal. The control instruction to the power supply switching device SW1 is notified through the GPIO. The CPU 11 maintains the connection status of each of the control devices TR1 to TR3 to be the disconnected (OFF) state.

Upon reception of the control instruction from the CPU 11, the power supply switching device SW1 connects the open-state input terminal (NC) to the output terminal. The output terminal of the SW1, whose connection is switched from the check power supply to the open-state input terminal, is connected to the power pin FM1 of the cradle connection connector 10A. As a result, the short-circuit current from the check power supply is prevented from passing between the power pin FM1 and the GND pin FM2 having the conductive foreign substance M1 adhering thereto.

As a result of detecting the short-circuit current, the power pin FM1 of the cradle connection connector 10A is connected to the open-state input terminal (NC) having no connection destination through the power supply switching device SW1. Moreover, the connection paths between the signal connection pins FM3 and FM4 of the cradle connection connector 10A and signals relating thereto are maintained in the disconnected state. The connection path between the contact pins DD1 and DD2 used as a loop circuit of the monitoring circuit DOCK_DET in the cradle connection connector 10A is maintained in the disconnected state.

Even when the cradle connection connector 10A, which is in the state of causing short-circuit due to the conductive foreign substance M1 adhering thereto, is connected with the main-body connection connector 20A, the information processing apparatus 10 does not receive the voltage applied between the power pin FM1 and the GND pin FM2. Since the power pin FM1 has no counter device to connect, the information processing apparatus 10 can suppress short-circuit failures of power reception devices such as the battery 10B. Moreover, the voltage is not applied to P_CN, and power supply is not exchanged. Furthermore, since the connection paths of related signals are disconnected, short-circuit failures can be suppressed.

Moreover, the connection paths between each of the signal connection pins FM3 and FM4 of the cradle connection connector 10A and signals relating thereto inside the information processing apparatus 10 are in the disconnected state. This prevents a short-circuit current, which flows in from each of the signal connection pins FM3 and FM4 through the conductive foreign substance M1, from flowing into the signal paths. The information processing apparatus 10 can suppress short-circuit failures of devices caused by application voltage at the time of occurrence of short-circuit, the devices being connected through the connection paths with each of the signal connection pins, the short-circuit failures being.

The connection path between the contact pins DD1 and DD2 used as a loop circuit of the monitoring circuit DOCK_DET in the cradle connection connector 10A is in the disconnected state. Accordingly, a status value indicative of "not connected with main body" is notified to the cradle 20 connected to the information processing apparatus 10. For example, the user of the information processing apparatus 10 can recognize abnormal connection between the cradle 20 and the information processing apparatus 10 based on the status value notified to the cradle 20 side.

When the cradle connection connector 10A is not in the state of causing the short-circuit, the overcurrent protection device IC1 does not detect a short-circuit current. Hence, the "ERROR#" signal is not notified to the CPU 11. For example, the CPU 11 monitors notification of "ERROR#" signal during a prescribed period after instruction to the power supply switching device SW1 regarding control of connection to the check power supply.

Here, the prescribed period is a monitoring period set in ms units or the like. For example, the monitoring period can be obtained on an experimental basis. For example, a period from adhesion of various conductive foreign substances to the cradle connection connector 10A to reception of notification of the "ERROR#" signal is measured. The monitoring period may be set based on the measured period. The monitoring period may be set by user operation of the information processing apparatus 10.

When notification of "ERROR#" signal is not received from the overcurrent protection device IC1 during the prescribed period, the CPU 11 executes connection control so that the external interface function provided by the cradle 20 or the like can be utilized.

For example, the CPU 11 notifies the power supply switching device SW1 of a control instruction so that a connection path to the check power supply, which is connected to the output terminal, is switched to a connection path to the connection terminal PV_1. The connection terminal PV_1 is connected to the chargeable battery 10B. The connection terminal PV_1 is connected to an AC adapter.

Upon reception of the control instruction notified through the GPIO, the power supply switching device SW1 switches the input terminal connected to the output terminal to another input terminal to which the connection terminal PV_1 is connected. The power supply of the battery 10B connected to the connection terminal PV_1 is connected to the power pin FM1 of the cradle connection connector 10A through the power supply switching device SW1.

The CPU 11 switches each connection status of the control devices TR1 to TR3 from the disconnected state to the connected state (ON), for example. The control devices TR1 and TR2 connect connection paths between each of the signal connection pins of the cradle connection connector 10A and signals relating thereto. The signal connection pins FM3 and FM4 of the cradle connection connector 10A are connected to the signals relating thereto through the control devices TR1 and TR2.

The control device TR3 connects the connection path between the contact pins DD1 and DD2 used as a loop circuit of the monitoring circuit DOCK_DET in the cradle connection connector 10A. With the loop circuit of the monitoring circuit DOCK_DET whose connection path is in the connected state, a status value indicative of "connected with main body" is notified to the cradle 20 side. For example, the user of the information processing apparatus 10 can recognize normal connection formed between the cradle 20 and the information processing apparatus 10 based on the status value notified to the cradle 20 side.

For example, the battery 10B of the information processing apparatus 10 can be charged with electric power which is provided through the power pin FM1 and the GND pin FM2. The information processing apparatus 10 can utilize the electric power provided through the power pin FM1 and the GND pin FM2 as an external power supply. The information processing apparatus 10 can utilize various interfaces provided through each of the signal connection pins FM3, FM4 and the like.

[Processing Flow]

Figure 4:
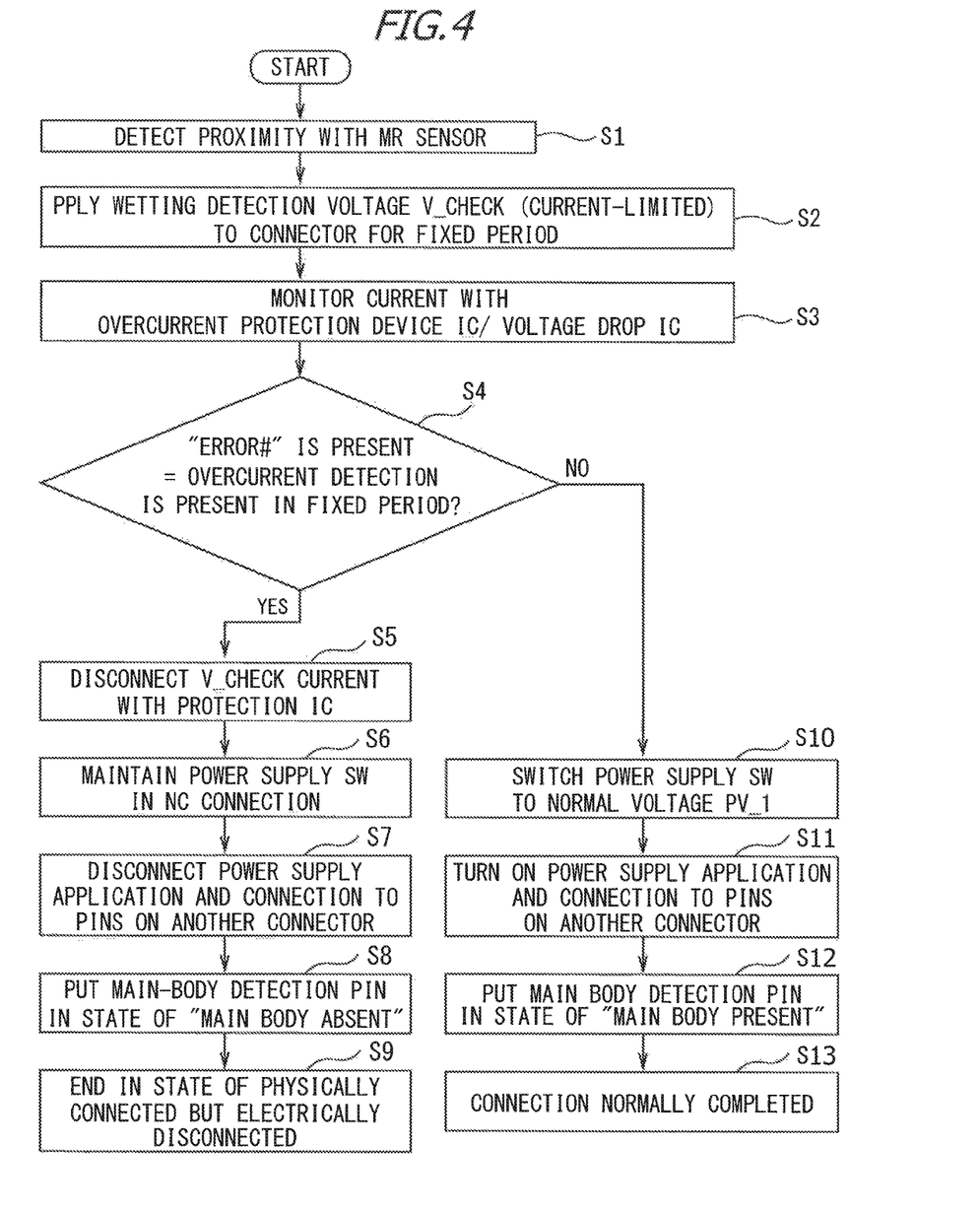
FIG. 4 is a flow chart illustrating connection control processing.

Hereinafter, short-circuit detection/connection control processing in the information processing apparatus 10 of the present embodiment will be described with reference to the flow chart illustrated in FIG. 4. FIG. 4 illustrates a flow chart of the short-circuit detection/connection control processing based on detection of the proximate cradle 20 or the like. The CPU 11 or the like in the information processing apparatus 10 performs the short-circuit detection/connection control processing by reading and executing various programs and various data which are stored in the auxiliary storage 13, for example.

In the flow chart illustrated in FIG. 4, the short-circuit detection/connection control processing may be started, for example, when the information processing apparatus 10 is connected with the cradle 20 or the like. As described in FIG. 3, in the initial state, the power pin FM1 of the cradle connection connector 10A in the information processing apparatus 10 is connected to the open-state input terminal (NC) of the power supply switching device SW1. Similarly, the connection paths of each of the signal connection pins FM3 and FM4 of the cradle connection connector 10A with signals relating thereto are in the disconnected state. The connection path between the contact pins DD1 and DD2 used as a loop circuit of the monitoring circuit DOCK_DET, which monitors the state of connection with the cradle 20 or the like, is in the disconnected state.

The information processing apparatus 10 detects proximity of the cradle 20 or the like to the information processing apparatus 10 through the MR sensor 14B, for example (S1). The information processing apparatus 10 receives a detection signal output from the MR sensor 14B, for example. The information processing apparatus 10 detects proximity of the cradle 20 or the like to the information processing apparatus 10 based on the level of the received detection signal. The proximity of the cradle 20 or the like is detected by, for example, comparison between the level of the detection signal received from the MR sensor 14B and a prescribed threshold value. Here, the prescribed threshold value is a threshold value for determining proximity distance to the cradle 20 or the like.

For example, the information processing apparatus 10 experimentally measures a relative distance between the cradle 20 or the like and the information processing apparatus 10, and a level of the detection signal of the MR sensor 14B corresponding to the relative distance. The prescribed threshold value can be determined based on the relation between the measured relative distance and the level of the detection signal. The prescribed threshold value may be set by, for example, user operation of the information processing apparatus 10.

For example, the information processing apparatus 10 applies power supply voltage (V_CHECK) of the check power supply, which is connected to the connection terminal V_CHECK, to the power pin FM1 of the cradle connection connector 10A, when proximity of the cradle 20 or the like is detected (S2). The power supply voltage of the check power supply is applied to the power pin FM1 of the cradle connection connector 10A for a fixed period of time. Application of the power supply voltage (V_CHECK) of the check power supply to the power pin FM1 of the cradle connection connector 10A has been described in FIG. 3.

The information processing apparatus 10 monitors a short-circuit current which is generated between the power pin FM1 and the GND pin of the cradle connection connector 10A through, for example, the overcurrent protection device IC1 or the voltage drop IC (S3). Monitoring of the short-circuit current with the overcurrent protection device IC1 or the voltage drop IC has been described in FIG. 3.

When conductive foreign substances, such as water, solvents, and metallic granular materials, adhere to the cradle connection connector 10A, the short-circuit current is detected. On the contrary, when the conductive foreign substances do not adhere to the cradle connection connector 10A, the short-circuit current is not detected. The overcurrent protection device IC1 or the voltage drop IC notifies the CPU 11 of "ERROR#" signal when the short-circuit current is detected, for example.

The information processing apparatus 10 determines whether or not notification of "ERROR#" signal is present in a fixed period (S4), for example. When notification of "ERROR#" signal is present in a fixed period (S4, YES) for example, the information processing apparatus 10 shifts to processing of S5. In the processing of S5-S9, the information processing apparatus 10 performs processing to disconnect reception of electric power applied through the cradle connection connector 10A. The processing of S5-S9 has been described in FIG. 3.

When notification of "ERROR#" signal is absent in a fixed period (S4, NO) for example, the information processing apparatus 10 shifts to processing of S10. In the processing of S10-S13, the information processing apparatus 10 performs connection processing to receive the electric power applied through the cradle connection connector 10A. The processing of S10-S13 has been described in FIG. 3.

In processing of S5, the information processing apparatus 10 disconnects the short-circuit current generated between the power pin FM1 and the GND pin FM2 of the cradle connection connector 10A, for example. For example, the short-circuit current is disconnected by the overcurrent protection IC 1.

In processing of S6, the information processing apparatus 10 switches the connection path to the power pin FM1 of the cradle connection connector 10A to an open state (NC) with no connection destination, for example. For example, the information processing apparatus 10 controls the power supply switching device SW1 to switch the connection path to the power pin FM1 so that the connection path is connected to the open-state input terminal having no connection destination in the power supply switching SW1.

In processing of S7, the information processing apparatus 10 maintains the connection paths to each of the signal connection pins of the cradle connection connector 10A in the disconnected state, for example. For example, the information processing apparatus 10 maintains each connection status of the control devices TR1 and TR2 of the short-circuit detection/connection control unit 101 in the disconnected state.

In processing of S8, the information processing apparatus 10 maintains the connection path between the contact pins DD1 and DD2 in the monitoring circuit DOCK_DET of the cradle connection connector 10A in the disconnected state, for example. With the monitoring circuit DOCK_DET in the disconnected state, a status value indicative of "not connected with main body" is notified to the cradle 20 side connected to the information processing apparatus 10.

Through the processing of S5-S8, the cradle connection connector 10A of the information processing apparatus 10 is in the state of physically connected to but electrically disconnected from the main-body connection connector 20A of the cradle 20 side (S9).

In the processing of S10, the information processing apparatus 10 switches the connection path to the power pin FM1 of the cradle connection connector 10A so that the connection path is connected to the connection terminal PV_1 to which the battery 10B or the like is connected, for example. For example, the information processing apparatus 10 controls the power supply switching device SW1 to switch the connection path to the power pin FM1 so that the connection path is connected to the input terminal to which the connection terminal PV_1 is connected.

In processing of S11, the information processing apparatus 10 switches the connection paths to each of the signal connection pins of the cradle connection connector 10A to the connected state, for example. For example, the information processing apparatus 10 switches each connection status of the control devices TR1 and TR2 of the short-circuit detection/connection control unit 101 to the connected state.

In processing of S12, the information processing apparatus 10 switches the connection path between the contact pins DD1 and DD2 in the monitoring circuit DOCK_DET of the cradle connection connector 10A to the connected state, for example. With the monitoring circuit DOCK_DET in the connected state, a status value indicative of "connected with main body" is notified to the cradle 20 side connected to the information processing apparatus 10.

Through the processing of S10-S12, the cradle connection connector 10A of the information processing apparatus 10 is in the state of normally connected to the main-body connection connector 20A of the cradle 20 side (S13). That is, the apparatus is put in the state of being able to utilize the external interface function provided by the cradle 20 through the cradle connection connector 10A.

The information processing apparatus 10 is connected with the cradle 20 or the like after the processing of S13. After the cradle 20 or the like is connected, the information processing apparatus 10 detects separation of the cradle 20 or the like through the MR sensor 14B, and sets the connection state of the cradle connection connector 10A to the initial state, for example. Separation of the cradle 20 or the like can be detected on condition that the connected cradle 20 or the like is not proximate, for example.

Here, the processing of S1-S3 executed in the information processing apparatus 10 is one example of a detection step of applying prescribed voltage to the power reception unit and detecting an adhesion state of a conductive foreign substance in the power reception unit, when proximity of the other electronic equipment is detected. The CPU 11 or the like of the information processing apparatus 10 executes the processing of S1-S3 as one example of the detection unit which applies prescribed voltage to the power reception unit and detects an adhesion state of a conductive foreign substance in the power reception unit, when proximity of the other electronic equipment is detected.

The processing of S4-S13 executed in the information processing apparatus 10 is one example of a control step of disconnecting electric power supply through the power reception unit in accordance with the adhesion state of the conductive foreign substance in the power reception unit. The CPU 11 or the like in the information processing apparatus 10 executes the processing of S4-S13 as one example of the control unit which disconnects electric power supply through the power reception unit in accordance with the adhesion state of the conductive foreign substance in the power reception unit.

The processing of S4-S9 executed in the information processing apparatus 10 is one example of the control step of disconnecting electric power supply through the power reception unit, when adhesion of the conductive foreign substance is detected in the power reception unit. The CPU 11 or the like in the information processing apparatus 10 executes the processing of S4-S9 as one example of the control unit which disconnects electric power supply through the power reception unit, when adhesion of the conductive foreign substance is detected in the power reception unit.

The processing of S4-S13 executed in the information processing apparatus 10 is one example of the control step of connecting a path of supplying drive power from the power terminal to the electronic equipment and connecting a path of signal transfer to and from the other electronic equipment through the signal terminal, when adhesion of the conductive foreign substance is not detected in the power reception unit. The CPU 11 or the like in the information processing apparatus 10 executes the processing of S4-S13 as one example of the control unit which connects the path of supplying drive power from the power terminal to the electronic equipment and connects the path of signal transfer to and from the other electronic equipment through the signal terminal, when adhesion of the conductive foreign substance is not detected in the power reception unit.

As described in the foregoing, the information processing apparatus 10 of the present embodiment can detect proximity of another electronic equipment such as a cradle before connection with the other electronic equipment. The information processing apparatus 10, which detected proximity of the other electronic equipment such as a cradle, can determine whether or not the cradle connection connector 10A is in the state of causing short-circuit due to adhesion of the conductive foreign substance, for example.

The information processing apparatus 10 of the present embodiment can disconnect the connection paths to internal devices when, for example, the cradle connection connector 10A is in the state of causing short-circuit due to adhesion of the conductive foreign substance. The information processing apparatus 10 of the present embodiment can put the connection paths to the internal devices in the connected state when, for example, the cradle connection connector 10A is not in the state of causing short-circuit.

As a result, the information processing apparatus 10 of the present embodiment can control voltage application to the power pin in accordance with the adhesion state of the conductive foreign substance in the cradle connection connector 10A before connection with the cradle 20 or the like. Similarly, the information processing apparatus 10 of the present embodiment can control signal connection to the signal connection pins in accordance with the adhesion state of the conductive foreign substance in the cradle connection connector 10A before connection with the cradle 20 or the like. The information processing apparatus 10 of the present embodiment can suppress short-circuit failures caused by energization at the time of connection with the cradle 20 or the like, even when the cradle connection connector 10A is in the state of causing short-circuit as the conductive foreign substance adheres to the cradle connection connector 10A.

<Computer Readable Recording Medium>

It is possible to record a program which causes a computer, machine, system (hereinafter, described as computer or the like) to implement any of the functions described above on a computer readable recording medium. By causing the computer or the like to read in the program from the recording medium and execute it, the function thereof can be provided.

The computer readable recording medium mentioned herein indicates a recording medium which stores information such as data and a program by an electric, magnetic, optical, mechanical, or chemical operation and allows the stored information to be read from the computer or the like. Of such recording media, those detachable from the computer or the like include, e.g., a flexible disk, a magneto-optical disk, a CD-ROM, a CD-R/W, a DVD, a Blu-ray disc, a DAT, an 8-mm tape, a flash memory and a memory card. Of such recording media, those fixed to the computer or the like include a hard disk, a ROM or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. Electronic equipment, comprising:
a power reception unit that receives electric power supplied from another electronic equipment to be connected;
a proximity detection unit that detects proximity of the other electronic equipment;

a detection unit that applies prescribed voltage to the power reception unit and detects an adhesion state of a conductive foreign substance in the power reception unit, when proximity of the other electronic equipment is detected; and a control unit that limits electric power supply through the power reception unit in accordance with the adhesion state of the conductive foreign substance in the power reception unit, wherein the power reception unit includes: a power terminal that receives supply of drive power of the electronic equipment; and a signal terminal that performs signal transfer to and from the other electronic equipment, and wherein the control unit connects a path of supplying drive power from the power terminal to the electronic equipment and connects a path of signal transfer to and from the other electronic equipment through the signal terminal, when adhesion of the conductive foreign substance is not detected in the power reception unit.

2. The electronic equipment according to claim 1, wherein the control unit disconnects electric power supply through the power reception unit, when adhesion of the conductive foreign substance is detected in the power reception unit.

3. The electronic equipment according to claim 1, wherein the control unit includes: a path of applying prescribed voltage to the power terminal, a path of supplying drive power to the electronic equipment, the drive power being supplied from the power terminal; and a path of putting the power terminal in a disengaged state, and when adhesion of the conductive foreign substance is detected in the power reception unit, the control unit switches the path to the power terminal from the path of applying prescribed voltage to the path of putting the power terminal in the disengaged state, and when adhesion of the conductive foreign substance is not detected in the power reception unit, the control unit switches the path to the power terminal from the path of applying prescribed voltage to the path of supplying drive power to the electronic equipment.

4. A computer-readable storage medium that stores a control program executable by a computer, the computer including a power reception unit that receives electric power supplied from another electronic equipment to be connected and a proximity detection unit that detects proximity of the other electronic equipment, wherein the power reception unit includes: a power terminal that receives supply of drive power of the electronic equipment; and a signal terminal that performs signal transfer to and from the other electronic equipment, and wherein the program instructs the computer to execute:

applying prescribed voltage to the power reception unit and detecting an adhesion state of a conductive foreign substance in the power reception unit, when proximity of the other electronic equipment is detected;

limiting electric power supply through the power reception unit in accordance with the adhesion state of the conductive foreign substance in the power reception unit, and connecting a path of supplying drive power from the power terminal to the electronic equipment and connects a path of signal transfer to and from the other electronic equipment through the signal terminal, when adhesion of the conductive foreign substance is not detected in the power reception unit.

5. A control method executed by a computer, the computer including a power reception unit that receives electric power supplied from another electronic equipment to be connected and a proximity detection unit that detects proximity of the other electronic equipment, wherein the power reception unit includes: a power terminal that receives supply of drive power of the electronic equipment; and a signal terminal that performs signal transfer to and from the other electronic equipment, and wherein the control method comprises:

applying, by a processor, prescribed voltage to the power reception unit and detecting, by the processor, an adhesion state of a conductive foreign substance in the power reception unit, when proximity of the other electronic equipment is detected; and limiting, by the processor, electric power supply through the power reception unit in accordance with the adhesion state of the conductive foreign substance in the power reception unit, and connecting a path of supplying drive power from the power terminal to the electronic equipment and connects a path of signal transfer to and from the other electronic equipment through the signal terminal, when adhesion of the conductive foreign substance is not detected in the power reception unit.

* * * * *